United States Patent [19]

Allavena

[11] Patent Number: 5,432,671
[45] Date of Patent: Jul. 11, 1995

[54] DEVICE FORMING TACTILE SCREEN OF THE CAPACITIVE TYPE

[75] Inventor: Jean-Pierre Allavena, Aix En Provence, France

[73] Assignee: Mors Composants, Caussade, France

[21] Appl. No.: 920,547

[22] PCT Filed: Feb. 19, 1991

[86] PCT No.: PCT/FR91/00131

§ 371 Date: Aug. 18, 1992

§ 102(e) Date: Aug. 18, 1992

[87] PCT Pub. No.: WO91/12592

PCT Pub. Date: Aug. 22, 1991

[30] Foreign Application Priority Data

Feb. 19, 1990 [FR] France .................. 90 01969

[51] Int. Cl.⁶ .................................................. H01G 7/00
[52] U.S. Cl. .................................. 361/280; 400/479.1; 345/173
[58] Field of Search .............. 361/278, 280, 330, 283; 200/52 R; 341/33; 400/479.1; 345/173

[56] References Cited

U.S. PATENT DOCUMENTS

| | | | |
|---|---|---|---|
| 3,696,409 | 10/1972 | Braaten | 340/365 |
| 4,090,092 | 5/1978 | Serrano | 200/52 R |
| 4,123,631 | 10/1978 | Lewis | 200/52 R |
| 4,161,766 | 7/1979 | Castleberry et al. | 361/280 |
| 4,205,418 | 6/1980 | Przybylek | 29/25 |
| 4,290,052 | 9/1981 | Eichelberger et al. | 361/20 |
| 4,394,643 | 7/1983 | Williams | 361/283 |
| 4,561,002 | 12/1985 | Chiu | 341/33 |
| 4,595,913 | 6/1986 | Aubochon | 307/116 |
| 4,614,937 | 9/1986 | Poujois | 340/365 C |
| 4,924,222 | 8/1990 | Antikidis | 341/33 |

Primary Examiner—Bruce A. Reynolds
Assistant Examiner—Michael D. Switzer
Attorney, Agent, or Firm—Steinberg, Raskin & Davidson

[57] ABSTRACT

A device forming a touch screen of the capacitive type intended in particular to cower a visualizing screen of a visualizing display unit such as a cathode ray tube. A group of electrically conducting transparent electrodes are arranged to be insulated from each other, not exposed to the outside and are connected to an electronic circuit for detecting capacitive variation. A second group of electrically conducting transparent electrodes insulated from each other are arranged to form front keys and are separated from the first group by a transparent dielectric material. The electrodes of the second group have substantially the same dimensions as the electrodes of the first group and are superimposed respectively upon the electrodes of the first group while facing one another so as to form pairs of capacitors. The effective capacity of each pair of capacitors varies when a body forming a mass reference frame is applied upon a front key. The electrodes of the second group are connected to the electronic detection circuit only by the electrodes of the first group.

22 Claims, 5 Drawing Sheets

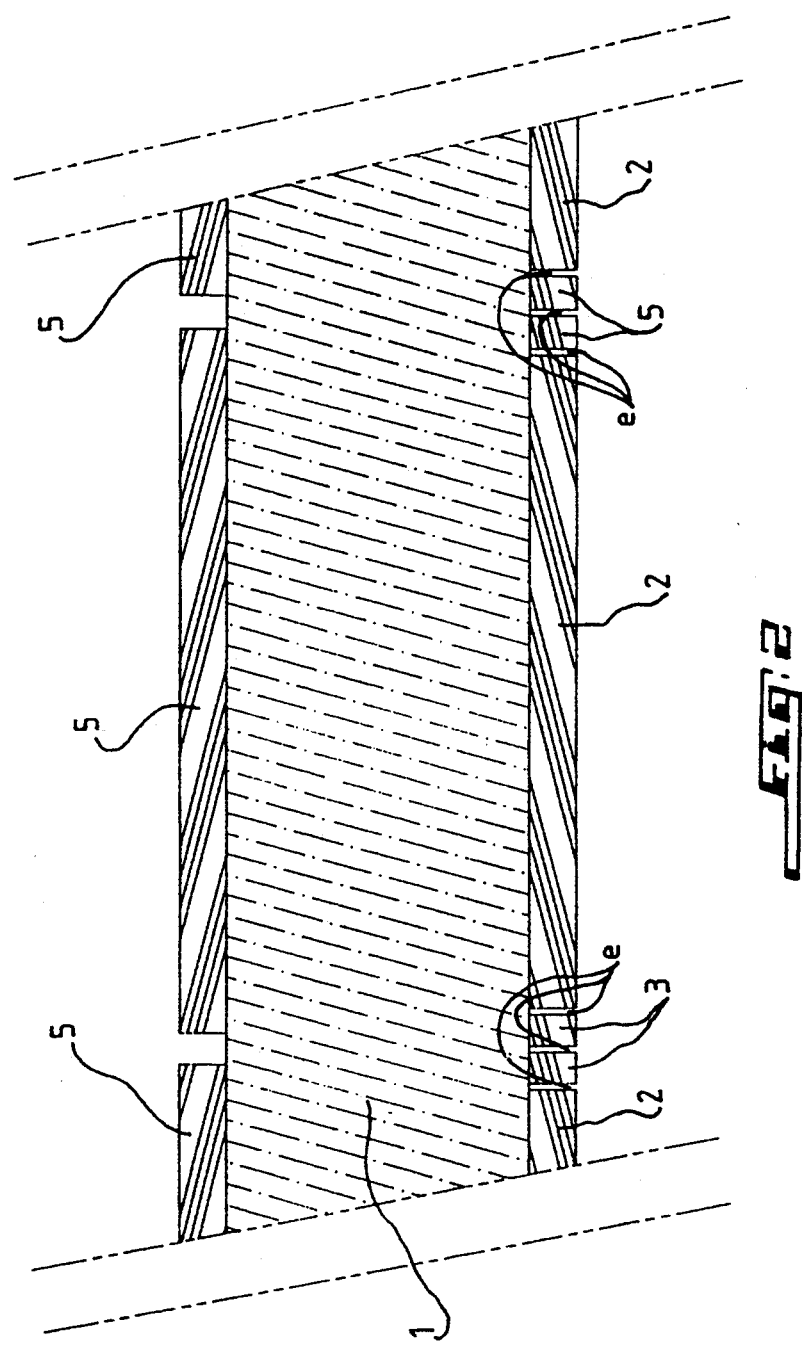

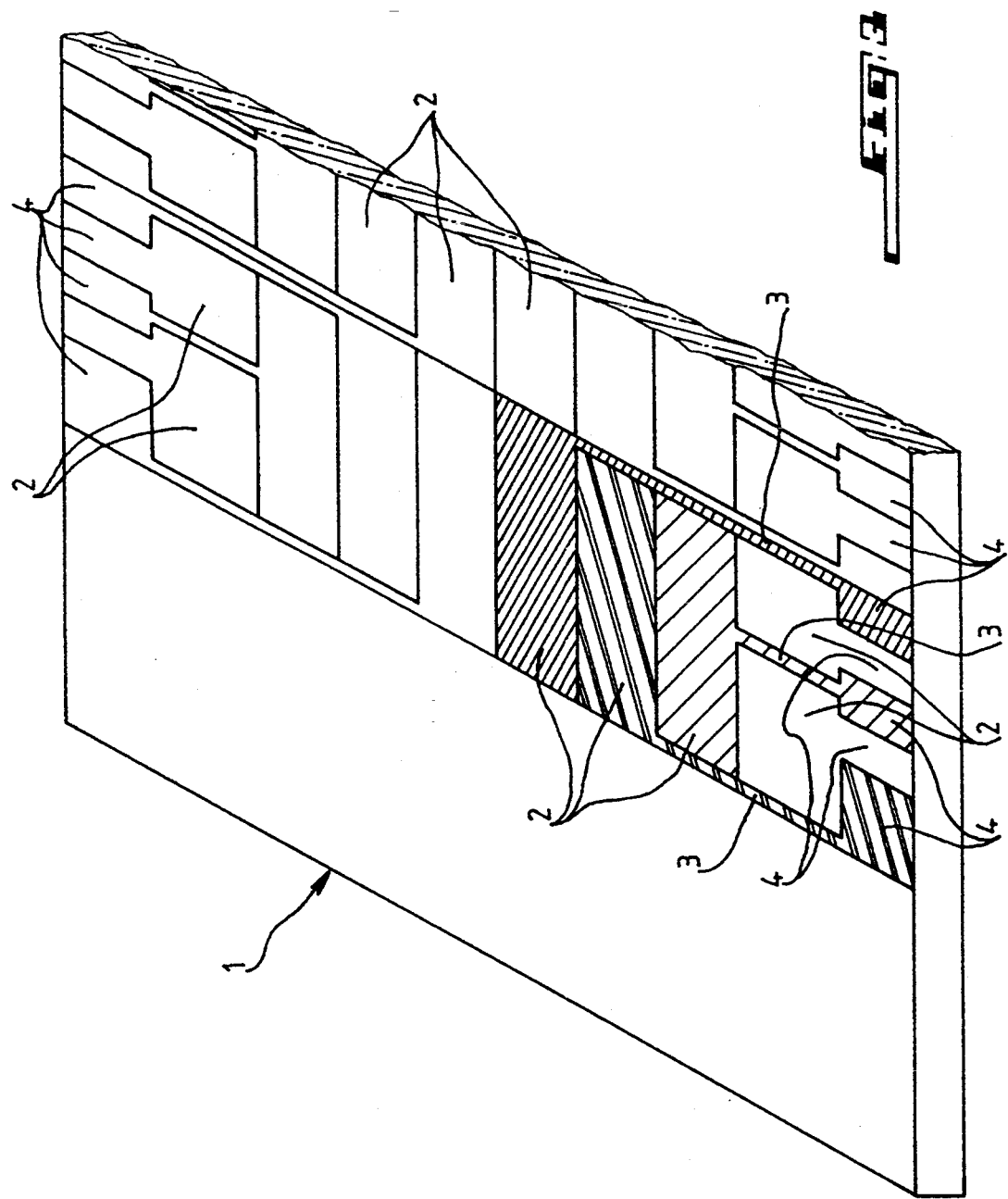

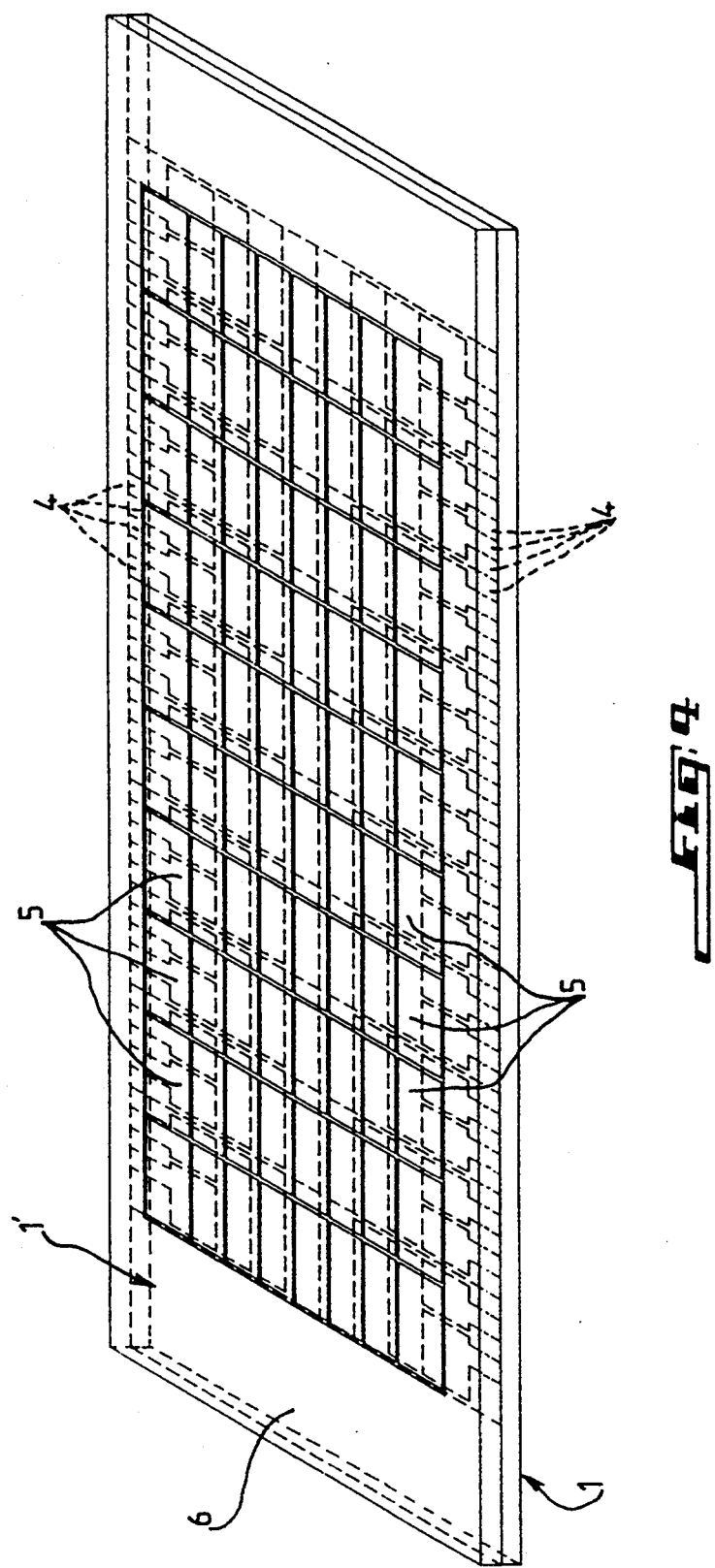

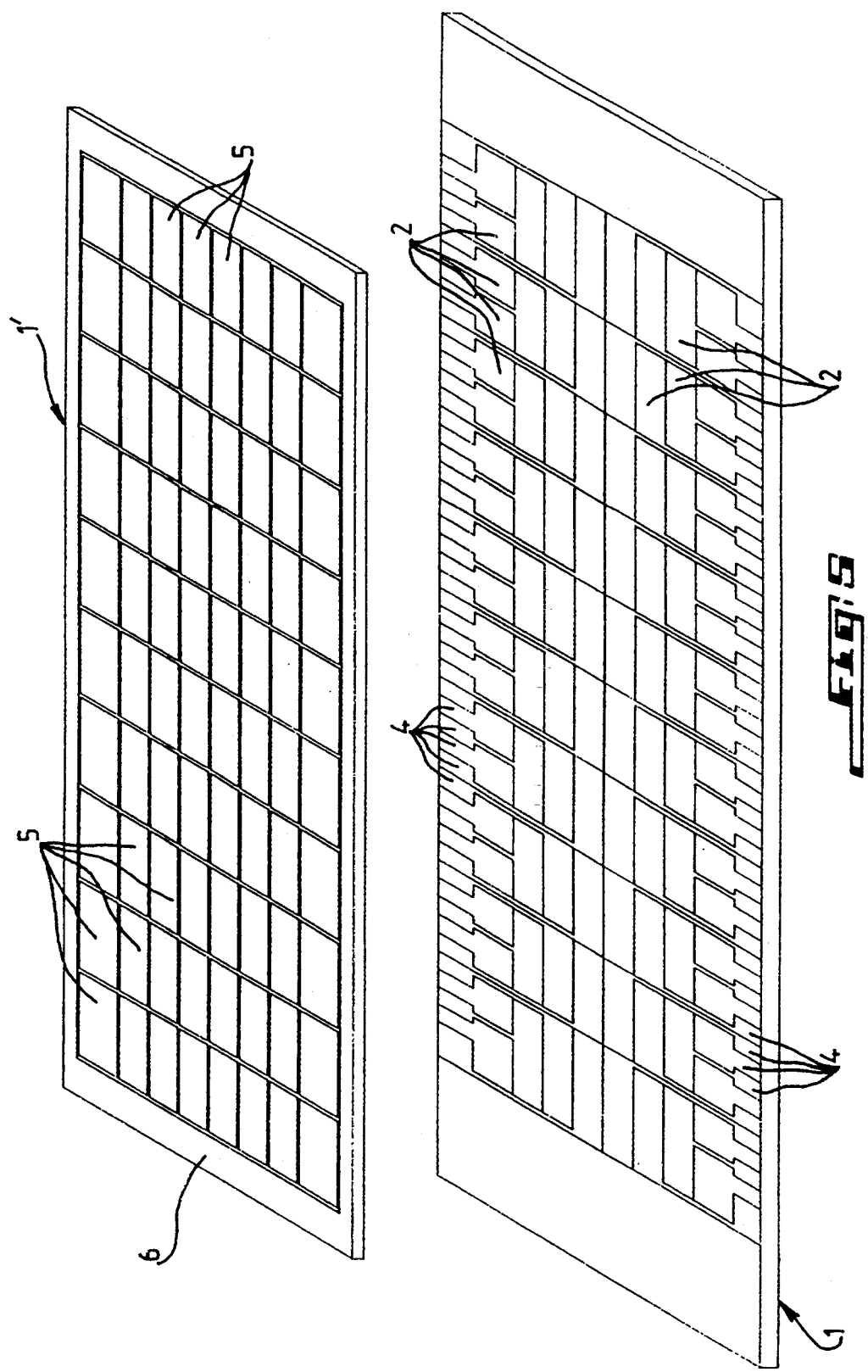

DEVICE FORMING TACTILE SCREEN OF THE CAPACITIVE TYPE

BACKGROUND OF THE INVENTION

The present invention relates to a device forming a touch screen of the capacitive type intended in particular to cover a visualizing screen of a visualizing display unit such for example as a cathode ray tube.

One knows such devices comprising a plate-shaped transparent dielectric substrate such as glass the front face of which opposite to the visualizing screen comprises a certain number of electrically conducting electrodes insulated from each other so as to form a matrix of keys. These electrodes forming keys are connected to an electronic circuit accommodated in the visualizing unit through the medium of conducting wires deposited on the front face of the substrate and terminating into two rows of contact points spaced from the lower and upper edges, respectively, of the substrate. The conducting wires for the connection of the internal electrodes of the matrix to the electronic circuit are disposed in the spaces between adjacent electrodes. The electrodes and the wires are generally made from indium and tin oxide. When an operator is putting a finger upon one of the electrodes forming keys there occurs a capacity variation influencing the natural frequency of an oscillator associated with this key forming a part of the electronic circuit.

These known devices exhibit the following inconveniences:
- an intensive use of the touch screen produces in the course of time a wear of the electrodes forming keys and of the conducting tracks which for the latter may result in an interruption of their continuity. This wear causes failures of the key-forming electrodes and of the tracks involved. This failure occurs pursuant to scratches of the front face of the touch screen which may also interrupt the continuity of the tracks;
- a transmission to the electronic circuit of erroneous data often occurs by direct touching of the connecting tracks instead of the electrodes forming keys in particular in the case where these electrodes are of relatively small dimensions;
- a destruction of the whole or a part of the electronic circuit associated with the electrodes forming keys by electrostatic discharges upon the screen is to be feared.

Some known devices provide the deposit of an insulating protective layer of $SiO_2$ or the like upon the front face of the touch screen but this layer is of a thickness limited by the present technique and is wearing out relatively quick so that the inconveniences mentioned hereinabove are found again.

SUMMARY OF THE INVENTION

The present invention proposes a device forming a touch screen of the capacitive type allowing to eliminate the inconveniences hereabove.

Therefore, the device according to the invention is characterized in that it comprises a first group of electrically conducting, transparent electrodes insulated from each other, not exposed to the outside and to be connected to an electronic circuit for the capacity variation detection and a second group of electrically conducting, transparent, free electrodes insulated from one another to form front keys and separated from the first group by a dielectric, the electrodes of the second group being superimposed to the electrodes of the first group while facing each other so as to form pairs of capacitors the capacity of each one of which varies when a body forming a mass reference frame such as a finger of an operator is put upon a front key.

According to an embodiment the electrodes of the first group are provided upon the rear face of a plate-shaped substrate of a transparent dielectric material such as glass and the electrodes forming keys of the second group are provided on the front face of the substrate.

According to another embodiment the electrodes of the first group are provided on the front face of a first plate-shaped substrate of a transparent dielectric material such as glass and the electrodes forming keys of the second group are provided on the front face of a second plate-shaped substrate of a transparent dielectric material fastened for example by sticking onto the front face of the first substrate.

According to a characteristic of the invention the first and second groups of electrodes form two matrices with columns and rows, respectively, and the electrodes of the first group are connected by very fine conducting tracks provided either on the back face of the aforesaid substrate or on the front face of the aforesaid substrate at electric contact points disposed in two rows along upper and lower edges, respectively, of the substrate.

According to still another characteristic of the invention a very thin electrically conducting layer ensuring an electrostatic protection is deposited upon the front face either of the aforesaid substrate by surrounding the aforesaid matrix of free electrodes in an insulating manner, this layer being grounded.

The distance separating the electrodes forming keys from the electrodes of the first group may vary from about 1 to 10 mm.

Preferably the aforesaid electrodes of the first group and the conducting layer are made from indium and tin oxide.

In addition the electrodes forming keys are made from indium and tin oxide or from tin and antimony oxide.

BRIEF DESCRIPTION OF THE DRAWINGS

The invention will be better understood and further objects, characteristics, details and advantages thereof will appear more clearly in the course of the explanatory description which will follow made with reference to the annexed diagrammatic drawings given by way of example only illustrating two embodiments of the invention and in which:

FIG. 2 is a view in section along the line II—II of FIG. 1.

FIG. 3 is a bottom view according to the arrow III of FIG. 1.

FIG. 4 is a perspective view of a touch screen according to the second embodiment of the invention.

FIG. 5 shows two separate substrates intended to form the screen of FIG. 4.

DETAILED DESCRIPTION OF THE INVENTION

Figure 1:
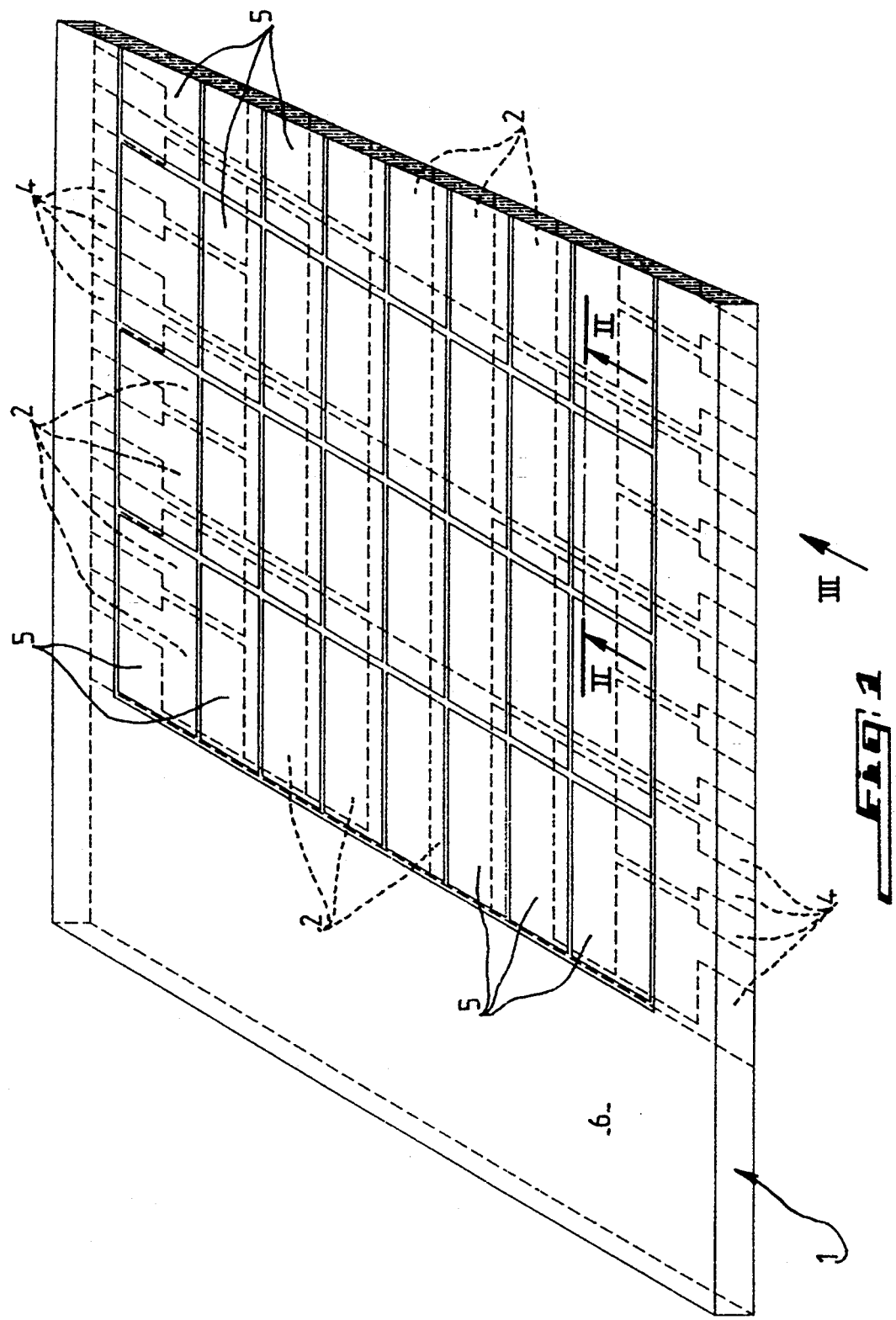
FIG. 1 shows as a perspective one portion of the touch screen according to the invention according to a first embodiment.

Referring to FIGS. 1 to 3 relating to a first embodiment of the invention the device forming a touch screen of the capacitive type comprises a substrate 1 in the shape of a rectangular plate made from a transparent dielectric material such as glass or from a suitable plastics material. Electrically conducting transparent electrodes or frames preferably of indium and tin oxide are provided on the rear face of the substrate 1 while being electrically insulated from each other. The electrodes 2 rectangular in the present case form a matrix of rows and columns and are connected through the medium of very fine invisible conducting tracks also of indium and tin oxide to an electronic processing circuit housed within a visualizing unit, for example a cathode ray tube upon the screen of which the substrate 1 is fastened in a suitable fashion with the electrodes 2 in front of the visualizing screen of the visualizing unit. FIG. 3 more precisely shows three conducting tracks 3 connected to three electrodes 2, respectively, which are identified by different hatches. The heavy lines of this FIG. 3 indeed represent the isolating spaces between the electrodes 2, the spaces being identified on FIG. 2 by the reference e. The conducting tracks 3 thus intended to electrically connect the internal electrodes 2 not adjacent to the upper and lower edges of the substrate 1, terminate into contact points 4 the shape of strips made fast to the back face of the substrate 1 and disposed in two rows along the upper and lower edges, respectively, of the substrate 1. The electrodes 2 disposed in rows in proximity to the upper and lower edges of the substrate 1 consists in fact of two electrodes of a length approximately one half of the other electrodes and are connected directly to two contact points 4, respectively, of a shape identical with that of the other contact points, these two contact points being electrically connected to one another by an electric wire not shown. It should be understood that the configuration of the electrodes 2 and of the conducting tracks 3 such as it appears from FIG. 3 is given by way of example only, other different configurations being possible. The electric connection between the contact points 4 and the electronic processing circuit is effected for example by a connecting strip with studs coming elastically in contact upon the contact points 4, respectively, of each row, which studs are connected by conducting wires to the electronic circuit.

The obtainment of the various electrodes 2 is effected in a conventional manner by depositing upon the rear face of the substrate 1 a very fine layer of indium and tin oxide and by cutting this layer by a laser beam at different zones so as to form the matrix of electrodes. The formation of the conducting tracks 3 is also obtained by cutting with the laser beam.

The front face of the substrate 1 comprises identical electrodes or frames 5 of a transparent conducting material forming a matrix of rows and columns and superimposed to the electrodes 2, respectively, while facing each other so as to form pairs of capacitors, the capacity of each one of which varies when a body forming a mass reference frame such as a finger of an operator is put upon an electrode 5 forming a front key. The electrodes 5 are provided in the same manner as the electrodes 2, i.e. by depositing upon the front face of the substrate 1 a very fine layer of a conducting material and by cutting with the laser beam this layer to form the electrodes 5 which are thus electrically insulated from each other. The electrodes 5 are free or "in the air" i.e. they are not all connected to the electronic processing circuit. The material constituting the electrodes 5 may be indium and tin oxide or indium and antimony oxide mechanically stronger. Preferably the dimensions of the electrodes 5 are identical with those of the electrodes 2.

By way of example the thickness of the dielectric substrate may be comprised between about 1 mm and 10 mm.

The operation of the device forming a touch screen results already from the description which has been made thereof hereinabove and which will now be explained.

The electronic processing circuit permitting to detect a capacity variation "sees" at each pair of capacitors a practically zero capacity value as long as none of the electrodes forming keys 5 has been activated.

When an operator is putting a finger upon one key 5, the electronic circuit sees a capacitor formed by the activated electrode 5 and the series facing electrode 2 with the capacity of the human body. Since the capacity of the human body is very great with respect to the capacity value of each capacitor formed of two electrodes 2 and 5, the electronic circuit has approximately a capacity the value of which is that of the capacitor formed of the electrodes 2 and 5, the capacity value of the human body being negligible in the calculation of the value of the total capacity. The electronic processing equipment adapted to detect this increase in capacity may for example be the one described in the U.S. Pat. No. 3,696,409 so that the electrodes 2 be connected to oscillators, respectively, the natural frequency of each one of which is lowered when the key 5 of the capacitor associated with the oscillator is activated. By scanning with the assistance of the known electronic device the different pairs of capacitors and detecting the one having modified the natural frequency of an isolator which is associate therewith, the conversational dialogue between the operator and the electronic equipment may be continued according to a determined program.

The device forming a touch screen allows it to very clearly detect a frequency variation owing to a very clear capacity variation of the capacitor of which one has touched the corresponding electrode 5, which was not at all the case with the prior known touch screens since the position of a finger of an operator on a key resulted in the formation of a bad capacitor the value of which was depending of the more or less strong pressure of application of this finger. On the contrary according to the invention, independently of the pressure of the finger upon each key 5, a same significant capacity variation is obtained. In other words the detection of the capacity variation is independent of the quality of the touching. Moreover since the conductive tracks and the electrodes 2 are formed on the back face of the substrate 1 and are therefore exposed externally, any direct contact therewith is prevented and consequently the transmission of erroneous data is no longer possible. Furthermore the screen becomes insensitive to scratches owing to the fact that the active electrodes 2 are not exposed and if in the worst of the cases a scratch should be such that it would divide a front key 5 into two equal portions reducing the value of the capacitive coupling by about 50%, the electronic circuit could be conceived so as to take into account the situation wherein the operator applies its finger upon one of the two keys halves 5. Of course if the finger is applied upon a scratch dividing a key 5 by two, the capacitive coupling would remain normal. It is also to be noted that no wear of the fine conducting tracks 3 or interruption of the latter is possible since being located on the rear face of the substrate 1 and the provision of keys in particular of indium and antimony oxide is imparting them a better resistance to wear. The protection against electrostatic discharges is naturally higher since the front face of the screen is insulated from the active circuits by the glass substrate 1, the capacitive coupling alone being capable of transmitting the discharge energy but which is very limited. One may possibly provide a complementary protection against the electrostatic discharges by depositing a layer of indium and tin oxide 6 upon the front face of the substrate 1 and surrounding in an electrically insulated fashion the pattern of keys 5, the layer 6 being grounded.

The second embodiment of the device according to the invention differs from the first embodiment only by the fact that the electrodes 2 and 5 are provided on two plate-shaped, identical, transparent, dielectric substrates for example of glass, respectively, fastened one upon the other for instance by bonding. More precisely the electrodes 2 are formed on the front face of the substrate 1 according to a configuration identical with that of the first embodiment and the electrodes forming keys 5 are formed on the forward face or front face of the substrate 1' according to a configuration identical with that of the electrodes 5 of the first embodiment. The substrate 1' is then assembled by gluing onto the substrate 1 so as to obtain a unitary whole forming a touch screen. Apart from these differences the device of this second embodiment is operating and provides the same advantages than that described on FIGS. 1 to 3 and has in addition a better protection against electrostatic discharges owing to the increased thickness by the superimposition of the substrates 1 and 1'.

To perfect the protection of the keys 5, it is possible to deposit one layer of $SiO_2$ upon the front face of the touch screen. Moreover a protection against high frequency interferences may be carried out by providing for the second embodiment a layer of indium and tin oxide deposited upon the whole surface of the rear face of the substrate 1 so as to form a shield.

Advantageously a design performed by serigraphy on the substrate is provided so as to materialize the matrix of electrodes forming keys 5. The device forming a touch screen of the invention may used with any type of screen known until now. In particular this device may be applied to a screen described in the U.S. Pat. No. 4,293,734 with a view to stabilize the drift this type of screen is suffering from.

One has described the formation of the electrodes 2 and 5 with the assistance of a laser circuit but any other method may be used to form them, for example by chemically attaching the corresponding deposited layer. Moreover in the second embodiment both substrates 1 and 1' instead of being adhered together may be mechanically assembled one upon the other by suitable means.

The touch screen of the invention has been described as being susceptible of being applied upon a visualizing screen of a data processing equipment with a view to establish a dialogue with an operator but it should be understood that it may also be used for other applications such for example as the control of electric household appliances.

I claim:

1. Device forming a touch screen of the capacitive type for covering a display screen, comprising
   a first group of electrically conducting transparent first electrodes insulated from each other, not exposed to the outside,
   a second group of electrically conducting transparent second electrodes insulated from each other to form front keys, and
   a substrate of a transparent dielectric material, said second group of electrodes being separated from the first group of electrodes by said transparent dielectric material, the second electrodes of the second group having substantially the same dimensions as the first electrodes of the first group and being superimposed respectively upon the electrodes of the first group while facing one another so as to form capacitors, each capacitor comprising a first electrode and a second electrode in superimposed relationship thereto, the effective capacity of a respective one of said capacitors varying when a body forming a mass reference frame is applied upon a second electrode of said capacitor, the capacitance of the body being in series with each of said capacitors, and
   an electronic circuit for detecting a variation in capacitance, said circuit being connected only to said first electrodes and not to said second electrodes to detect a variation in effective capacity of any one of said capacitors.

2. Device according to claim 1, wherein the electrodes of the first group are arranged on a rear face of the substrate of the transparent dielectric material and the electrodes of the second group are arranged on a front face of the substrate.

3. Device according to claim 1, wherein the electrodes of the first group are arranged on a front face of a first plate-shaped substrate of the transparent dielectric material and the electrodes of the second group are arranged on a front face of a second plate-shaped substrate of the transparent dielectric material, said second plate-shaped substrate being fastened onto the front face of the first substrate.

4. Device according to claim 1, wherein the first and second groups of electrodes form two matrices with columns and rows, respectively, and the electrodes of the first group are connected by very fine conducting tracks arranged on a back face of a substrate of the transparent dielectric material at electric contact points disposed into at least one row along one of the upper and lower edges of the substrate.

5. Device according to claim 2, further comprising an electrically conducting layer deposited onto the front face of the substrate of the transparent dielectric material while surrounding in an insulated manner the electrodes of the second group forming a matrix, said layer being grounded and ensuring electrostatic protection.

6. Device according to claim 1, wherein the distance separating the electrodes of the second group from the electrodes of the first group is about 3 mm.

7. Device according to claim 1, wherein the electrodes of the first group are made from indium and tin oxide.

8. Device according to claim 1, wherein the electrodes forming keys are made from indium and tin oxide or from tin and antimony oxide.

9. Device according to claim 5, wherein the substrate comprises a design obtained by serigraphy defining the matrix of electrodes.

10. Device according to claim 1, wherein said electronic circuit comprises a number of oscillators associated with said pairs of electrodes, respectively, the natural frequency of each oscillator being modified at each modification of effective capacity of the associated capacitor resulting from the position of the body forming a mass reference frame constituted by one finger of an operator.

11. Device according to claim 2, wherein the dielectric material is glass.

12. Device according to claim 3, further comprising a layer of indium and tin oxide deposited onto the entire surface of a rear face of the first substrate to ensure a protection against high frequency interferences.

13. Device according to claim 1, wherein the electrodes and conducting layer are made from indium and tin oxide.

14. Device according to claim 3, wherein said second plate-shaped substrate is fastened by sticking onto the front face of the first substrate.

15. Device according to claim 3, further comprising an electrically conducting layer for ensuring an electrostatic protection deposited onto the front face of said second substrate, said second group of electrodes forming a matrix with columns and rows, said electrically conducting layer surrounding in an insulated manner said matrix of said second group of electrodes and being grounded.

16. Device according to claim 15, wherein the substrate comprises a design obtained by serigraphy defining said matrix of electrodes.

17. Device according to claim 1, wherein the first group of electrodes forms a first matrix and the second group of electrodes forms a second matrix, said second matrix aligning with, and having the same dimensions as, said first matrix such that individual ones of electrodes in the first group of electrodes face individual ones of electrodes in the second group of electrodes.

18. Device according to claim 1, wherein said electronic circuit detects a zero value at non-activated ones of said pairs of capacitors and detects a capacitance at activated ones of said pairs of capacitors activated by the body forming a mass reference frame.

19. Device forming a touch screen of the capacitive type for covering a display screen, comprising
 a first group of electrically conducting transparent first electrodes insulated from each other, not exposed to the outside,
 a second group of electrically conducting transparent second electrodes insulated from each other to form front keys, and
 a substrate of a transparent dielectric material, said second group of electrodes being separated from the first group of electrodes by said transparent dielectric material, the second electrodes of the second group having substantially the same dimensions as the first electrodes of the first group and being superimposed respectively upon the electrodes of the first group while facing one another so as to form capacitors, each capacitor comprising a first electrode and a second electrode in superimposed relationship thereto, the effective capacity of a respective one of said capacitors varying when a body forming a mass reference frame is applied upon a second electrode of said capacitor, the capacitance of the body being in series with each of said capacitors, and
 an electronic circuit for detecting a variation in capacitance, said circuit being connected only to said first electrodes and not to said second electrodes to detect a variation in effective capacity of any one of said capacitors,
 said electronic circuit comprising a plurality of oscillators associated with a respective one of said capacitors, the natural frequency of each oscillator being modified at each modification of effective capacity of the respective capacitor resulting from a position of the body forming a mass reference frame constituted by one finger of an operator.

20. Device forming a touch screen of the capacitive type for covering a display screen, comprising
 a first plate-shaped substrate of a transparent dielectric material, said first substrate having a front face,
 a first group of electrically conducting transparent first electrodes insulated from each other, not exposed to the outside, the first electrodes of the first group being arranged on said front face of said first plate-shaped substrate,
 a second plate-shaped substrate of a transparent dielectric material, said second substrate having a front face and a rear face,
 a second group of electrically conducting transparent electrodes insulated from each other to form front keys and separated from the first group by said second plate-shaped substrate of transparent dielectric material, the second electrodes of the second group being arranged on said front face of said second plate-shaped substrate of transparent dielectric material, said rear face of said second plate-shaped substrate being fastened by sticking onto the front face of said first substrate,
 the second electrodes of the second group having substantially the same dimensions as the first electrodes of the first group and being superimposed respectively upon the first electrodes of the first group while facing one another so as to form capacitors, each capacitor comprising a first electrode and a second electrode in superimposed relationship thereto, the effective capacity of a respective one of said capacitors varying when a body forming a mass reference frame is applied upon a second electrode of said capacitor, the capacitance of the body being in series with each of said capacitors, and
 an electronic circuit for detecting a variation in capacitance, said circuit being connected only to said first electrodes and not to said second electrodes to detect a variation in effective capacity of any one of said capacitors.

21. Device forming a touch screen of the capacitive type for covering a display screen, comprising
 a first substrate of a transparent dielectric element, said first substrate having a front face and an opposed rear face,
 a first group of electrically conducting transparent first electrodes insulated from each other, not exposed to the outside, said first group of electrodes being arranged on said front face of said first substrate,
 a second plate-shaped substrate of a transparent dielectric element, said second substrate having a front face and an opposed rear face, a second group of electrically conducting transparent second electrodes insulated from each other to form front keys, said second group of electrodes being arranged on said front face of said second substrate, said rear face of said second substrate contacting said front face of said first substrate such that said second substrate separates said second group of electrodes from said first group of electrodes, said second electrodes in said second group having substantially the same dimensions as said first electrodes in said first group and being superimposed respectively upon said first electrodes in said first group while facing one another so as to form capacitors, the effective capacity of a respective one of said capacitors varying when a body forming a mass reference frame is applied upon a second electrode of said capacitor, the capacitance of the body being in series with each of said capacitors, and an electronic circuit for detecting a variation in capacitance, said circuit being connected only to said first electrodes and not to said second electrodes to detect a variation in effective capacity of any one of said capacitors, and a layer of indium and tin oxide deposited onto the entire surface of said rear face of said first substrate.

22. Device according to claim 21, wherein the first and second groups of electrodes form two matrices with columns and rows, respectively, and the first electrodes of the first group are connected by very fine conducting tracks arranged on said front face of said first substrate at electric contact points disposed into at least one row along one of the upper and lower edges of said first substrate.

* * * * *